United States Patent [19]
Jenkner

[11] Patent Number: 5,205,705
[45] Date of Patent: Apr. 27, 1993

[54] APPARATUS AND PROCESS FOR FEEDING PANELS TO A PANEL CUTTING SAW

[76] Inventor: Erwin Jenkner, Lindenstrasse 13, Gechingen, Fed. Rep. of Germany

[21] Appl. No.: 817,858

[22] Filed: Jan. 6, 1992

[30] Foreign Application Priority Data

Jan. 9, 1991 [DE] Fed. Rep. of Germany ....... 4100458

[51] Int. Cl.⁵ ............................................. B65G 59/02
[52] U.S. Cl. .................... 414/796.8; 83/39; 83/256; 83/404.2; 83/732; 144/242 E; 144/242 M; 144/245 F; 144/356; 414/17; 414/19
[58] Field of Search ............. 83/89, 91, 93, 10.5, 83/404.2, 417, 723; 414/17, 19, 796.8, 796.5; 144/242 R, 242 E, 242 M, 245 R, 245 F, 356, 357, 376, 379

[56] References Cited
U.S. PATENT DOCUMENTS

| | | | |
|---|---|---|---|
| 2,931,401 | 4/1960 | Lambert | 144/242 M |
| 4,340,137 | 7/1982 | Foster | 144/242 M |
| 4,427,330 | 1/1984 | Carter | 144/245 F |
| 4,431,358 | 2/1984 | Jenkner | 414/114 |
| 4,462,443 | 7/1984 | Allen | 144/242 E |
| 4,726,724 | 2/1988 | Jenkner | 414/796.8 |
| 4,988,265 | 1/1991 | Schwad et al. | 414/796.8 |
| 5,007,317 | 4/1991 | Jenkner | 83/256 |

FOREIGN PATENT DOCUMENTS

3206364 3/1983 Fed. Rep. of Germany .
3911639 10/1990 Fed. Rep. of Germany .

*Primary Examiner*—W. Donald Bray
*Attorney, Agent, or Firm*—Dick and Harris

[57] ABSTRACT

An apparatus and process for feeding panels to a panel cutting saw for conveying a stack of panels to a panel cutting saw so that the edges of the panels in the stack are aligned with respect to the cutting plane of the saw. An elevator platform supports a stack of panels. A panel conveyer transfers one or more panels at a time over a transfer platform to a panel feed platform. A repositionable barrier may be positioned between the saw and the panel feed platform. An alignment device aligns the panels of the stack against the barrier to produce a stack with at least one side in which the edges of the panels are aligned, prior to feeding of the stack into the panel cutting saw.

12 Claims, 7 Drawing Sheets

APPARATUS AND PROCESS FOR FEEDING PANELS TO A PANEL CUTTING SAW

BACKGROUND OF THE INVENTION

The present invention is directed to an apparatus and process for feeding substantially uniformly sized panels to a panel cutting saw. In particular, the present invention is directed to a panel feed device, for use with a panel cutting saw, which feed device is constructed with an elevator platform which holds a supply of stacked workpiece panels which are to be conveyed to a panel feed platform.

Typically, in such panel feed devices, the panels are only fed one at a time, usually by lifting by means of a suction device from the stack of panels on the elevator platform to the panel feed platform. The panel is fed, in increments, into the panel cutting saw. Before another panel can be fed to the panel feed platform, the working panel which is being sawed must be completely fed into and cut by the panel cutting saw. Accordingly, this required individual feeding of panels makes the throughput of the panel cutting machine very slow.

It is known that the output of a panel cutting saw can be increased if a number of stacked panels can be transferred at a time to the panel feed platform, and then cut simultaneously. However, the stacked panels must all be aligned so that at least their leading edges are flush, prior to the stack being fed into the panel cutting saw. Such a mutual alignment of the workpiece panels of a stack to be supplied to the panel cutting saw is often impossible, however, in view of the substantial combined weight of such panels, which may be in excess of one ton, with each panel having typical dimensions of 6500 millimeters by 2700 millimeters by 160 millimeters. In addition, the surface properties of the panels, which may be very rough, will produce great frictional forces which are difficult to overcome and thus may prevent such alignment.

It is an object of this invention therefore to provide a panel feed device which may permit the simultaneous feeding of a number of panels from an elevator platform to a panel feed platform, the subsequent alignment of the several stacked panels, and their subsequent simultaneous feeding through a panel cutting saw.

This and other objects of the invention will become apparent in view of the present Specification, claims and Drawings.

SUMMARY OF THE INVENTION

The present invention is directed to an apparatus and process for feeding panels to a panel cutting saw. In particular, the environment for the present invention is a panel feed device, which utilizes an elevator platform, which receives a supply of stacked workpiece panels to be cut. The workpiece panels will be transferred by a conveyer device from the elevator platform to a panel feed platform prior to their feeding to the panel cutting saw. A repositionable barrier is arranged parallel to the cutting plane of the panel cutting saw. The present invention comprises an alignment device which is movable along the direction of feed of the panels, which is positionable between the elevator platform and the panel feed platform for aligning panels which are conveyed onto the panel feed platform, against the repositionable barrier. The repositionable barrier is adjustable between at least a barrier position to a release position. The panel feed device additionally comprises a conveyer device for incrementally feeding workpiece panels which have been aligned and stacked on the panel feed platform, to the panel cutting saw.

With the use of the panel feed device according to the present invention, a stack of panels may be arranged on the panel feed platform, and one or more stacked workpiece panels, depending upon the weight of the panels, may be transferred from the elevator platform to the panel feed platform. After the arrival of each workpiece panel or partial stack on the panel feed platform, the panel or partial stack is aligned using the panel aligning device, so as to align the panel or partial stack relative to the panel or partial stack which is already positioned on the panel feed platform, so that all of the panels have their leading edge arranged extending parallel to the cutting plane of the panel cutting saw. After a predetermined number of workpiece panels has been supplied, an accurately aligned stack of panels has been created which can be then sent as a whole by increments to the panel cutting saw by means of the conveyer.

DETAILED DESCRIPTION OF THE DRAWINGS

Figure 1:
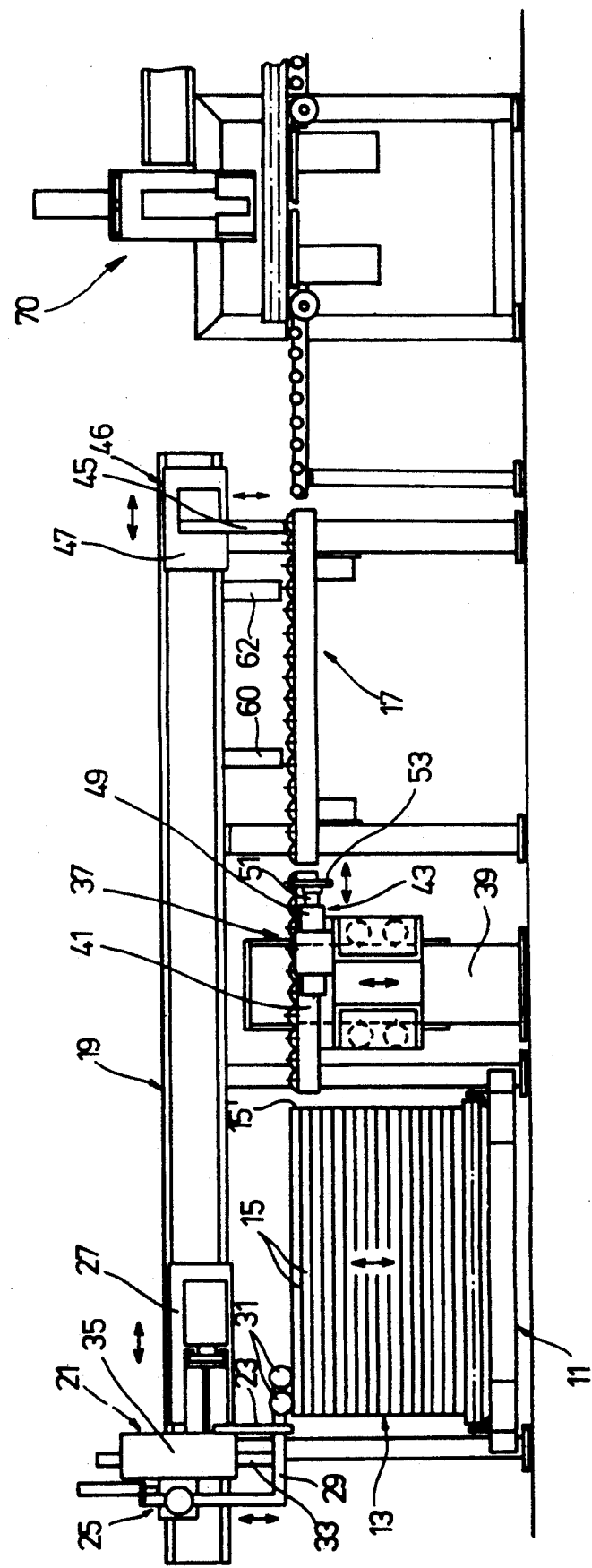
FIG. 1 is a side elevation of the panel feed device according to the preferred embodiment of the invention showing the panel conveyer device in a starting position.
Figure 2:
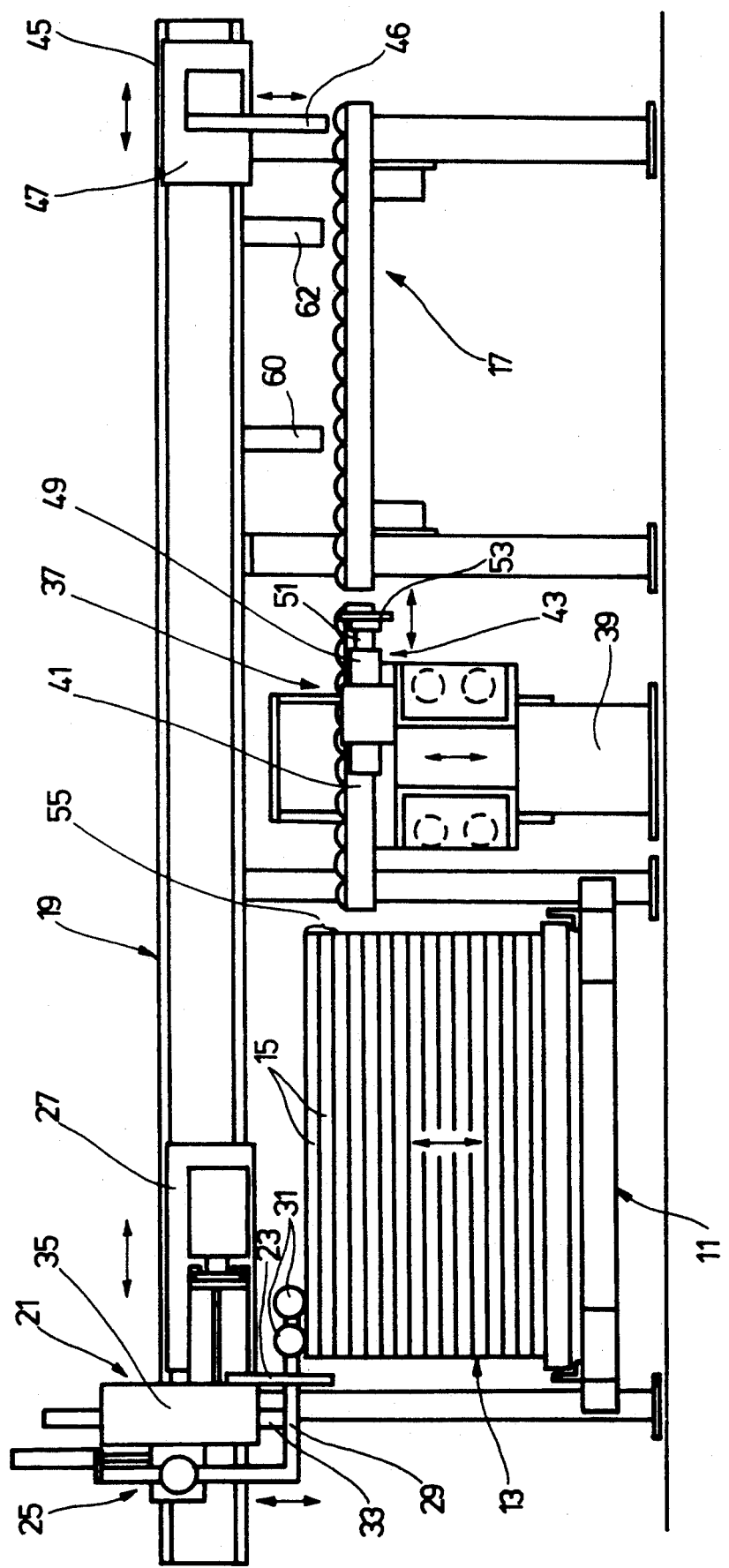
FIG. 2 is a side elevation of the panel feed device according to FIG. 1, showing the elevator platform, elevated prior to the transfer of panels onto the transfer platform.

While this invention is susceptible of embodiment in many different forms, there is shown in the drawings and is described herein in detail a specific embodiment, with the understanding that the present disclosure is to be considered as an exemplification of the principles of the invention and is not intended to limit the invention of the embodiment illustrated.

Computer-controlled elevator platform 11 of a known design is provided, as shown in FIG. to receive stack 13 of workpiece panels 15 to be cut by a panel cutting saw as indicated generally by reference numeral 70. The particular construction of panel saw 70 may be of known configuration and so will not be discussed. Panel feed platform 17 is designed as a roller table and is installed on the feed end of the panel cutting saw. Alternatively, contact strips without rollers may be provided instead of the roller paths.

In FIGS. 1-6, the panel cutting saw would be considered positioned adjacent to the right end of guide mechanism 19. The cutting plane of the panel cutting saw would extend perpendicularly to the lengthwise axis of guide mechanism 19, and would extend vertically, parallel to line A—A, as shown in FIG. 7.

Guide mechanism 19 extends along the direction of conveyance of the panels above elevator platform 11 and panel feed platform 17. A conveyer device 21 is arranged for travel along guide mechanism 19, and has at least one pusher 23 that projects downwardly. In addition, electronic computer-controlled probe 25 is also provided and is mounted, like pusher(s) 23 on carriage 27. Probe arm 29 has two successive sensor rollers 31. Probe arm 29 is carried by piston rod 33 of cylinder 35, mounted on carriage 27. A probe and pusher combination is disclosed in Jenkner, U.S. Pat. No. 4,726,724, and the operation of the probe and pusher elements in the present invention are understood to be similar to that disclosed in the identified patent. Pushers 23 and probe arm 29 are vertically positionable relative to each other to permit pusher(s) 23 to be able to push against several panels simultaneously.

In the present embodiment, transfer platform 37, which is vertically adjustable by predetermined increments on guide frame 39, in a computer-controlled manner, is positioned between elevator platform 11 and panel feed platform 17. Accordingly, the mechanism and controls of transfer platform 37 are distal of the saw cutting area and its volume of resulting sawdust.

Figure 7:
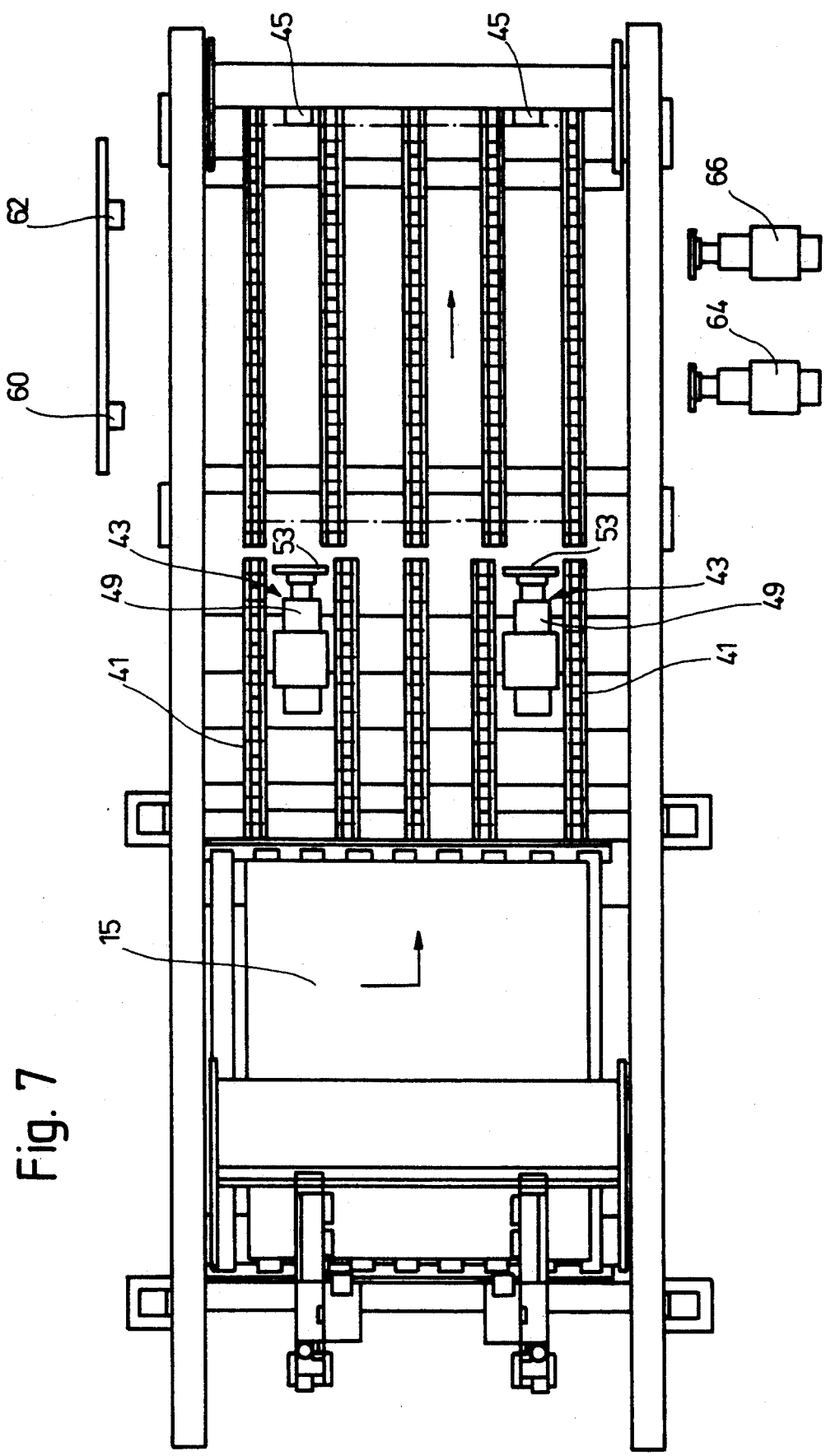
FIG. 7 is a top plan view of the panel feed device according to FIG. 1.

FIG. 7 shows that transfer platform 37 has several roller paths 41, extending in the direction of transport of workpiece panels 15, with panel alignment devices 43 positioned between roller paths 41. Panels 15, supplied to panel feed platform 17, can be aligned against barrier 45, so the edges 15' of panels 15, which face the saw, can be aligned parallel to the cutting plane of the saw.

Barrier 45 is vertically adjustable and is mounted on another carriage 47, which also can move horizontally along guide device 19.

Panel alignment devices 43 preferably have double-acting pneumatic or hydraulic cylinders 49, which have piston rods 51 which reciprocate along the direction of panel transfer. Each piston rod 51 has a supporting plate 53 mounted on the end of piston rod 51 facing panel feed platform 17.

According to FIG. 1, transfer platform 37, in its starting position, is at an elevation that corresponds to that of downstream panel feed platform 17 and the corresponding saw. Elevator platform 11 is also in its starting position.

Figure 6:
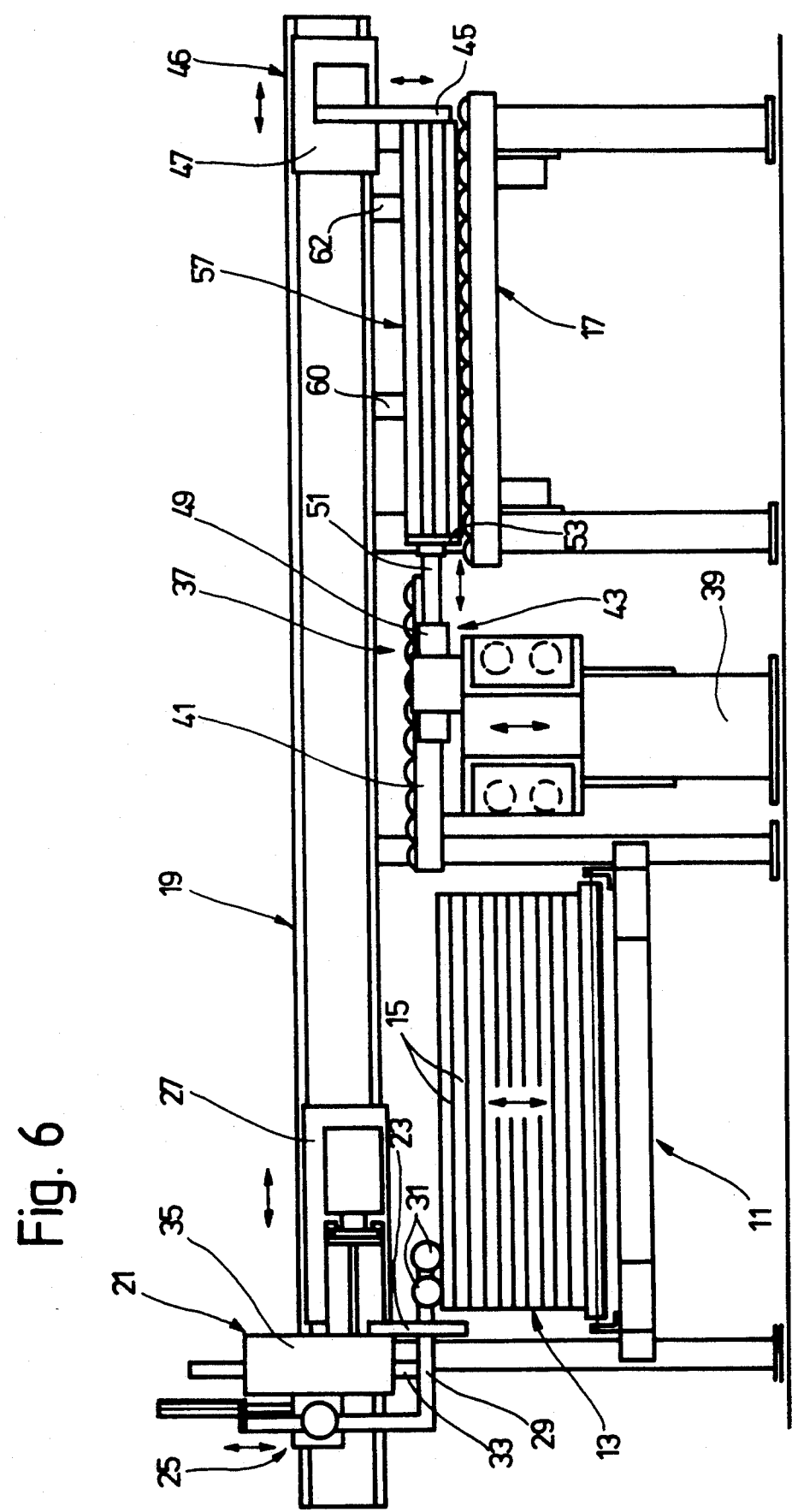
FIG. 6 is a side elevation of the panel feed device, according to FIG. 1, showing the alignment of the added panels on the panel feed platform.

Referring to FIG. 6, a stack of panels, consisting of four workpiece panels 15, is to be cut. Two pairs of stacked workpiece panels 15 have been pushed by pusher(s) 23 of conveyer device 21 from panel stack 13 on elevator platform 15, over transfer platform 37, onto panel feed platform 17. The number of workpiece panels 15 to be supplied to the panel feed platform 17 can be selected at will by computer input.

Returning to FIG. 2, to transfer the first pair of panels 15, elevator platform 11 is adjusted upward by a distance equal to twice the thickness of workpiece panels 15 in a computer-controlled operation. The lower edge of partial stack 55 to be fed (FIGS. 3 and 4) is thus elevated to the level of the transfer platform 37.

Sensor rollers 31 are contacted by the upper surface of the topmost panel 15 of stack 13 as elevator platform 11 is raised, thus causing probe arm 29 to move upward, causing probe 25 to produce an indication to the computer control (not shown) that elevator platform 11 has been elevated. When probe arm 29 is sufficiently raised, an indication is sent to the computer to cease elevation of elevator platform 11.

Figure 3:
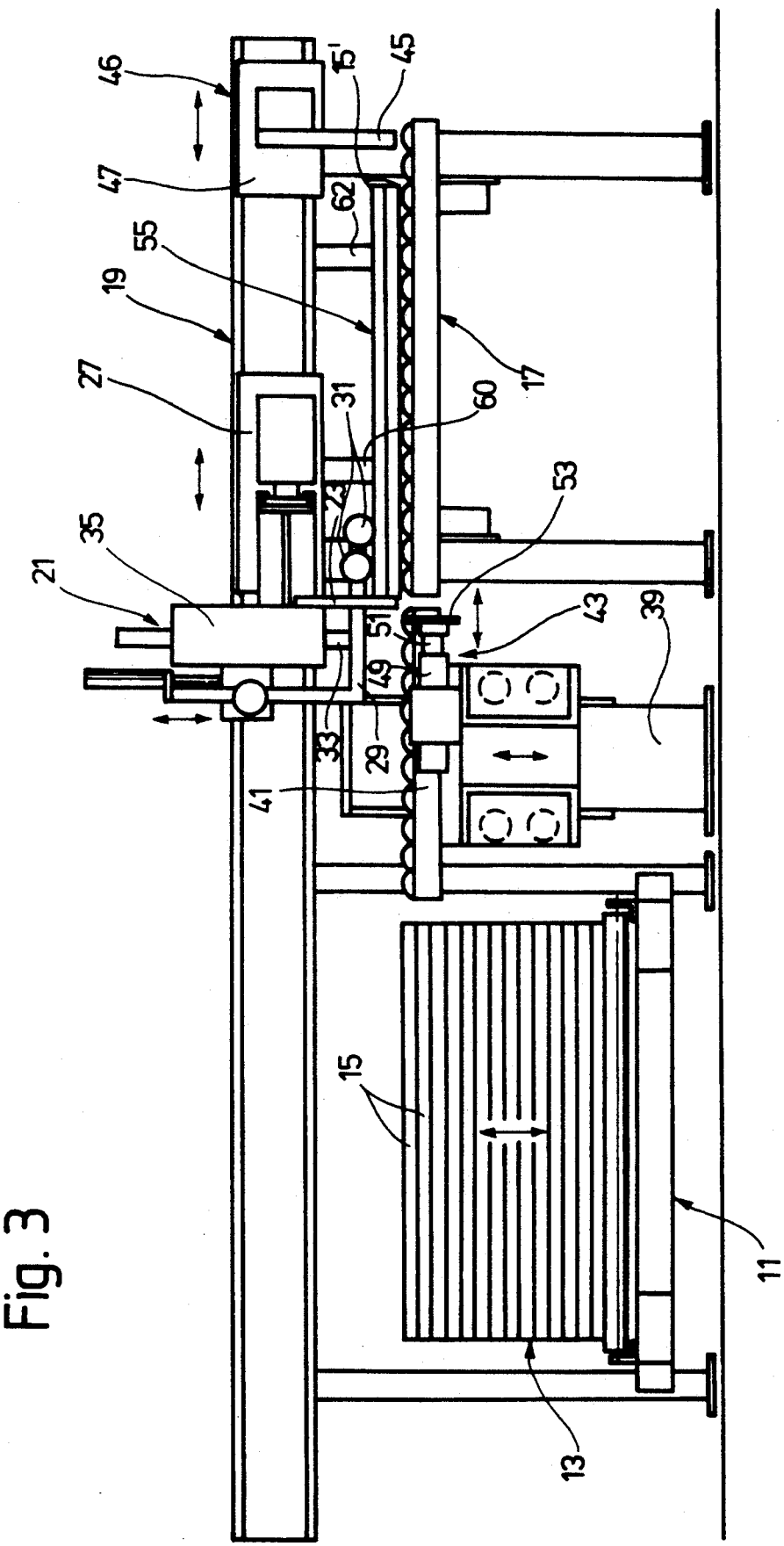
FIG. 3 is a side elevation of the panel feed device, according to FIG. 1, in which two panels have been transferred to the feed platform.

Next, partial stack 55 is propelled by conveyer device 21 and pusher(s) 23, over transfer platform 37, to panel feed platform 17 (FIG. 3). Panel feed platform 17 may be an independent structure, or it may also be part of the panel cutting saw. Conveyer device 21 travels past the transfer platform 37 and over panel feed platform 17 (FIG. 3).

Figure 4:
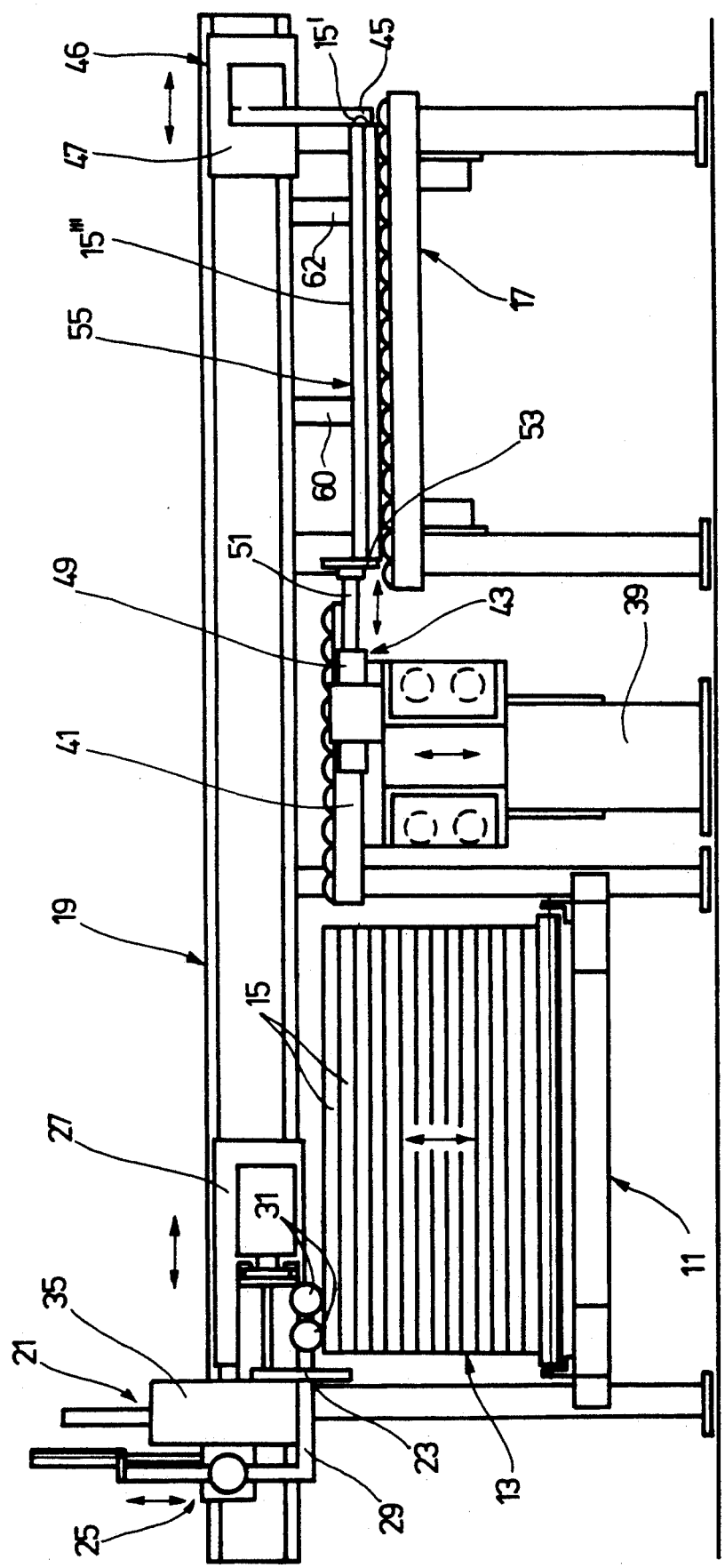
FIG. 4 is a side elevation of the panel feed device, according to FIG. 1, showing the alignment of two panels on the panel feed platform.
Figure 5:
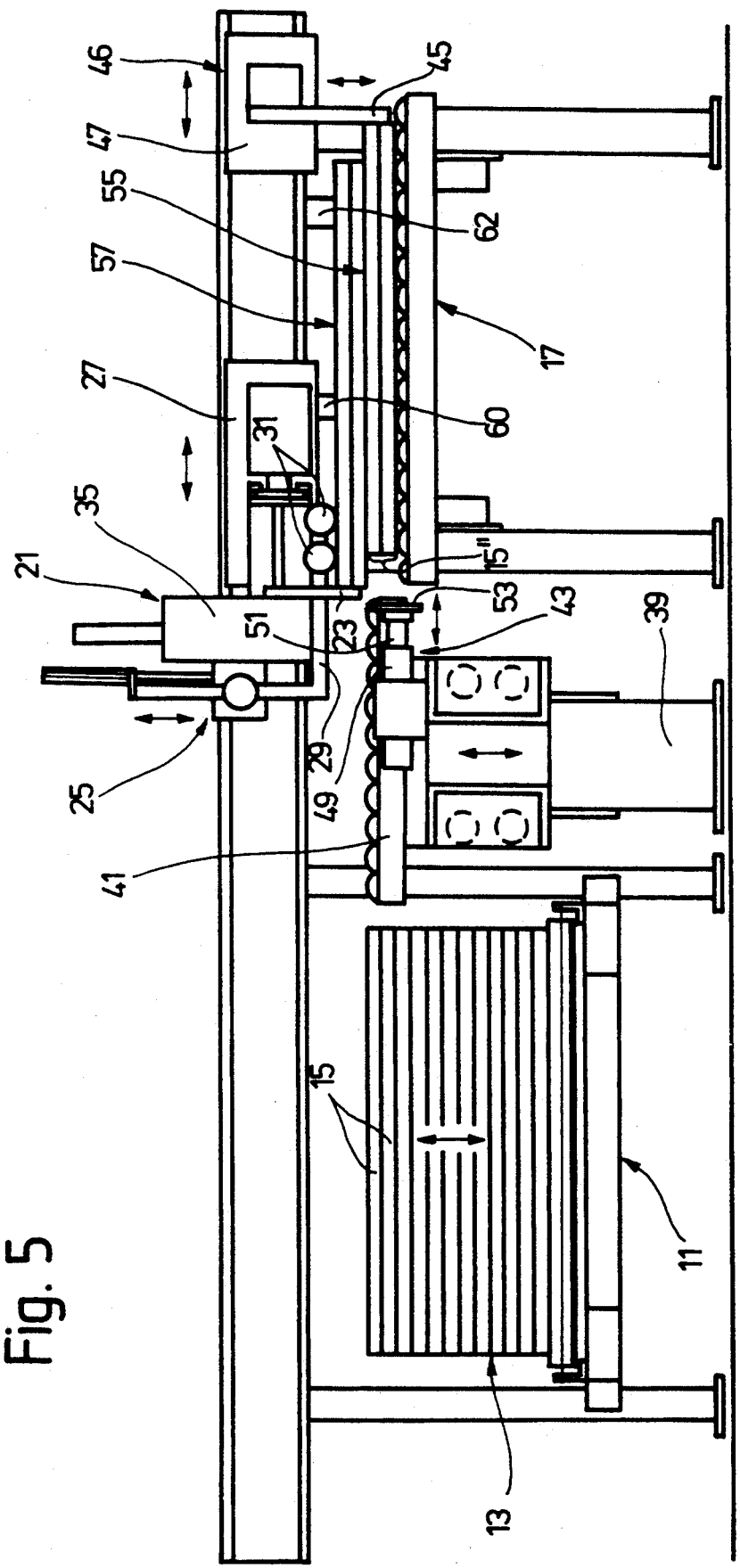
FIG. 5 is a side elevation of the panel feed device according to FIG. 1, showing the transfer of two further panels onto the panels, already stacked onto the panel feed platform.

Conveyer device 21 returns to its starting position, and transfer platform 37 is then raised, again by exactly the same distance as the height of partial stack 55, in a computer-controlled operation (FIG. 4). Alignment devices 43 then begin to operate and support plates 53 come in contact with the two rear edges 15" of workpiece panels 15, which are pushed so that front edges 15' come to rest against barrier 45. Workpiece panels 15 are all rectangular and are of the same front to rear dimensions. The two transferred panels are thus readily aligned parallel to the cutting plane due to their relatively low combined weight.

During this alignment operation, elevator platform 11 is moved upward by a distance equal to the height of the next partial stack, in a computer-controlled operation, in which the exact adjustment is determined anew by probe 25. Pusher(s) 23 are likewise adjusted to the new height of elevator platform 11 in a computer-controlled operation (FIG. 4).

Second partial stack 57 (FIG. 5) next is pushed by conveyer device 21, first onto transfer platform 37, which has meanwhile been lowered in a computer-controlled operation, such that the second partial stack is then in the plane of the top side of the top workpiece panel 15", Second partial stack 57 is then propelled by conveyer device 21 (FIG. 5) onto first partial stack 55 and then aligned, like the first partial stack 55, by means of aligning devices 43, for which purpose transfer platform 37 is again raised by a corresponding program step (FIG. 6).

After aligning the entire stack comprised of partial stacks 55, 57, barrier 45 is elevated and carriage 47 of feed device 46 is driven into an engagement position in the area between transfer platform 37 and panel feed platform 17, after which the barrier 45 is again lowered into its barrier position behind the entire combined stack comprised of partial stacks 55, 57 and the stack comprised of partial stacks 55, 57 is then conveyed by computer-controlled incremental forward movement of feed device 46 in the direction of the panel cutting saw in order to be cut.

During this panel feed procedure, elevator platform 11, conveyer device 21 and transfer platform 37 are returned to their starting positions for renewed loading of panel feed platform 17 in accordance with the operating program.

In addition to barrier 45, feed platform 17 may also be provided with further barrier members 60, 62 which are arranged perpendicular to the cutting plane of the panel cutting saw, as seen in FIG. 7, and second panel alignment devices 64, 66 to cooperate with the perpendicular barrier members, which operate at right angles to the panel feed direction so that workpiece panels 15 can also be aligned so that their side edges, which are parallel to the direction of panel transfer, are flush. For ease and clarity of illustration, alignment devices 64, 66 have been illustrated only in FIG. 7.

In an alternative embodiment of the invention, transfer platform 37 may be entirely eliminated, to instead position elevator platform 11, directly adjacent panel feed platform 17. In this embodiment, however, alignment devices 43 would have to be independently supported. In another alternative embodiment, conveyer device 21 may assume the function of feed device 46 for incrementally feeding the entire stack comprised of partial stacks 55, 57 to the panel cutting saw so that barrier 45 need only be designed to be vertically repositionable, and not horizontally repositionable. Conveyer device 21 might also assume the functions of alignment devices 43 if conventional provisions were made for relative vertical adjustment of at least pusher(s) 23 and panel feed platform 17.

The various operations described hereinabove, and in particular elevator platform 11, transfer platform 37, probe 25, conveyer device 21, alignment devices 21 and the other described elements may be controlled by computer in a known manner, and so, for ease of illustration, the control devices have been omitted.

The foregoing description and drawings merely explain and illustrate the invention and the invention is not limited thereto except insofar as the appended claims are so limited as those skilled in the art who have the disclosure before them will be able to make modifications and variations therein without departing from the scope of the invention.

What is claimed is:

1. A panel feed device for a panel cutting saw having a cutting plane and wherein a panel feed platform is arranged adjacent the panel cutting saw, the panel feed device having an elevator platform for receiving and transiently supporting a plurality of stacked workpiece panels to be cut, a barrier member operably arranged parallel to the cutting plane, and a first conveyer device for conveying at least one of the stacked workpiece panels along a feed path from the elevator platform toward the panel feed platform, the panel feed device comprising:

at least one panel alignment device operably positionable between the elevator platform and the panel feed platform and arranged for movement along the feed path, for aligning the panels against the barrier member;

the barrier member being operably disposed adjacent to the feed path, for reciprocating movement at least parallel thereto, substantially adjacent to the panel feed platform, and repositionable from at least a barrier position to a release position; and means operably disposed adjacent to the feed path for reciprocating movement at least parallel to the feed path, for incrementally feeding to the panel cutting saw workpiece panels which have been aligned and stacked on the panel feed platform.

2. The apparatus according to claim 1 further comprising:

a second barrier member extending perpendicular to the cutting plane of the panel cutting saw; and a second at least one panel alignment device operably arranged to cooperate with the second barrier member, for further alignment of the stack of workpiece panels along a direction perpendicular to the feed direction.

3. The apparatus according to claim 1 wherein the conveyor device further comprises:

a computer-controlled carriage operably disposed for reciprocating movement along the feed direction, above the elevation platform, panel alignment device and panel feed platform, for engaging at least one of the panels stacked on the elevator platform and propelling the at least one panel from the elevator platform to the panel feed platform.

4. The apparatus according to claim 1 in which the means for incrementally feeding to the panel cutting saw comprises a second conveyor device.

5. The apparatus according to claim 4 wherein the barrier member is configured as part of the second conveyor device and said second conveyor device is arranged for reciprocating movement along the feed direction and for incremental movement from the panel feed platform toward the cutting plane of the panel cutting saw, the barrier member being brought up against the rear edges of the panels in the stack on the panel feed platform to propel the stack toward the panel cutting saw.

6. The apparatus according to claim 1 further comprising a transfer platform operably disposed between the elevator platform and the panel feed platform, and configured to be vertically adjustable.

7. The apparatus according to claim 6 wherein the at least one panel alignment device is operably arranged on the transfer platform.

8. The apparatus according to claim 7 wherein the transfer platform further comprises a plurality of roller paths extending, in parallel spaced relation, along the feed direction, such that the transfer platform may be vertically adjusted to align the roller paths with an upper surface of a topmost panel of the stack on the panel feed platform.

9. The apparatus according to claim 7 wherein the at least one panel alignment device comprises at least one panel pushing device operably arranged between two of the contact strips.

10. A process for feeding stacked workpiece panels to a panel cutting saw, comprising the steps of:

propelling a first partial stack of panels from an elevator platform to a panel feed platform and depositing the partial stack onto the panel feed platform;

aligning the first partial stack of panels against a repositionable barrier member, which is disposed in a barrier position, with at least one panel alignment device disposed between the elevator platform and the panel feed platform;

propelling at least subsequent partial stack of panels from the elevator platform to the panel feed platform and depositing the subsequent partial stack onto the partial stack previously deposited on the panel feed platform; and aligning the subsequent partial stack against the barrier member with the at least one panel alignment device, to form an aligned stack of panels.

11. The process according to claim 10 further comprising the steps of:

repositioning the barrier member from the barrier position to a release position; and propelling the aligned stack of panels into the panel cutting saw.

12. The process according to claim 10 further comprising the steps of:

repositioning the barrier member from the barrier position to an engagement position behind the aligned stack of panels; and propelling the aligned stack of panels into the panel cutting saw with the barrier member.

* * * * *

UNITED STATES PATENT AND TRADEMARK OFFICE
CERTIFICATE OF CORRECTION

PATENT NO. : 5,205,705
DATED : April 27, 1993
INVENTOR(S) : Erwin Jenkner

It is certified that error appears in the above-identified patent and that said Letters Patent is hereby corrected as shown below:

Col. 2, Line 58    Delete "FIG." and instead insert
                   --FIG. 1--

Col. 4, Line 36    Delete " 15", " and instead insert
                   --15'''.--

Col. 6, Line 47    Delete "propelling at least subsequent" and instead insert
                   --propelling at least one subsequent--

Signed and Sealed this

Twenty-fifth Day of January, 1994

Attest:

BRUCE LEHMAN

Attesting Officer    Commissioner of Patents and Trademarks